(12) United States Patent
Nitta et al.

(10) Patent No.: US 10,986,394 B2
(45) Date of Patent: Apr. 20, 2021

(54) CAMERA SYSTEM

(71) Applicant: Ciao Inc., Tokyo (JP)

(72) Inventors: Tomoaki Nitta, Tokyo (JP); Ryuichi Watahiki, Tokyo (JP)

(73) Assignee: Ciao Inc., Tokyo (JP)

( * ) Notice: Subject to any disclaimer, the term of this patent is extended or adjusted under 35 U.S.C. 154(b) by 0 days.

(21) Appl. No.: 16/194,421

(22) Filed: Nov. 19, 2018

(65) Prior Publication Data

US 2019/0289357 A1 Sep. 19, 2019

(30) Foreign Application Priority Data

Mar. 19, 2018 (JP) .............................. JP2018-051432

(51) Int. Cl.
*H04N 21/4223* (2011.01)
*H04N 7/18* (2006.01)
*H04N 21/234* (2011.01)
*G08B 13/196* (2006.01)

(52) U.S. Cl.
CPC ......... *H04N 21/4223* (2013.01); *H04N 7/181* (2013.01); *H04N 21/23418* (2013.01); *G08B 13/19682* (2013.01)

(58) Field of Classification Search
None
See application file for complete search history.

(56) References Cited

U.S. PATENT DOCUMENTS

| | | | |
|---|---|---|---|
| 2007/0297769 A1 | 12/2007 | Mae et al. | |
| 2008/0252448 A1* | 10/2008 | Agarwalla | G08B 13/1968 340/540 |
| 2009/0073161 A1* | 3/2009 | Park | G11B 27/11 345/418 |

(Continued)

FOREIGN PATENT DOCUMENTS

| | | |
|---|---|---|
| JP | H08-096264 A | 4/1996 |
| JP | 2001-340610 A | 12/2001 |

(Continued)

OTHER PUBLICATIONS

Mae et al. English translation, 2008 (Year: 2008).*

(Continued)

*Primary Examiner* — Fernando Alcon
(74) *Attorney, Agent, or Firm* — Nakanishi IP Associates, LLC

(57) ABSTRACT

A camera system includes: a camera base position-providing unit providing an image that bases are displayed on a map based on the information with respect to the positions of the bases wherein cameras are installed, the information being stored by the camera installation information-storing unit; a thumbnail image-providing unit providing an image wherein a list of thumbnail images are displayed, the thumbnail images corresponding to the cameras installed within one or more bases selected from among the bases displayed on the map, the thumbnail images being obtained from an image data-storing unit; and a moving image-providing unit providing moving images corresponding to one or more cam- (Continued)

eras selected from among the cameras whose thumbnail images are displayed in the list by the thumbnail image-providing unit, the moving images being obtained from the image data-storing unit.

9 Claims, 7 Drawing Sheets

(56) References Cited

U.S. PATENT DOCUMENTS

| | | | |
|---|---|---|---|
| 2013/0091432 A1 | 4/2013 | Shet et al. | |
| 2014/0040808 A1* | 2/2014 | Kim | G06F 3/04817 715/771 |
| 2015/0168144 A1 | 6/2015 | Barton et al. | |
| 2016/0173828 A1* | 6/2016 | Kim | H04N 7/181 348/144 |
| 2018/0061065 A1* | 3/2018 | Mayuzumi | G06K 9/00771 |
| 2018/0101970 A1* | 4/2018 | Waniguchi | G06Q 50/26 |
| 2019/0260987 A1* | 8/2019 | Amini | H04L 43/0858 |

FOREIGN PATENT DOCUMENTS

| | | |
|---|---|---|
| JP | 2002-330425 A | 11/2002 |
| JP | 2003-259340 A | 9/2003 |
| JP | 2007-053568 A | 3/2007 |
| JP | 2007-166550 A | 6/2007 |
| JP | 2008-005294 A | 1/2008 |
| JP | 2008005294 A * | 1/2008 ........... G11B 27/105 |
| JP | 2013-109418 A | 6/2013 |
| JP | 6049024 B2 | 12/2016 |
| JP | 2017-169181 A | 9/2017 |

OTHER PUBLICATIONS

Extended European Search Report issued in European Patent Application No. 18209152.0, dated Feb. 21, 2019 (8 pages).

Office Action issued in Japanese Patent Application No. 2018-051432, dated Jan. 7, 2020, with English Translation (8 pages).

Office Action issued in Korean Patent Application No. 10-2018-0154288, dated Jan. 2, 2020, with English Translation (7 pages).

* cited by examiner

CAMERA SYSTEM

BACKGROUND OF THE INVENTION

1. Field of the Invention

The present invention relates to a camera system displaying images of a large number of cameras installed within a plurality of bases.

2. Description of the Related Art

The applicant has developed an image-transmitting apparatus capable of suppressing a data transmission amount while preventing from blur and/or an after-image upon transmitting continuous frame images to compose moving images (See, Reference 1.).

According to this image-transmitting apparatus, it enables to obtain moving images with high quality in the small data transmission amount, and to install many cameras within a plurality of bases at low cost. Therefore, further advances are expected toward spreading cameras for the purpose of crime prevention, monitoring, and so on.

Reference 1: Japanese Patent No. 6049024.

OBJECTS AND SUMMARY OF THE INVENTION

On the other hand, when a large number of cameras have been installed within a plurality of bases, management of the cameras must become difficult.

That is, as increase in the installation of many cameras to various places throughout the country, it becomes difficult to specify a specific camera among many cameras scattered in the whole country so as to confirm images of the specified camera, thereby causing a serious problem.

In view of the above in the present invention, an object thereof is to provide a camera system capable of:

easily specifying a camera among many cameras respectively installed within a plurality of bases; and confirming images of the specified camera.

A camera system according to the present invention, comprises: a plurality of cameras installed within a plurality of bases, respectively; a camera installation information-storing unit storing information with respect to positions of the bases wherein the cameras are installed; an image data-storing unit storing images photographed by the cameras as moving images and thumbnail images, respectively; a camera base position-providing unit providing an image that the bases are displayed on a map based on the information with respect to the positions of the bases wherein the cameras are installed, the information being stored by the camera installation information-storing unit; a thumbnail image-providing unit providing an image wherein a list of the thumbnail images are displayed, the thumbnail images corresponding to the cameras installed within one or more bases selected from among the bases displayed on the map, the thumbnail images being obtained from the image data-storing unit; and a moving image-providing unit providing moving images corresponding to one or more cameras selected from among the cameras whose thumbnail images are displayed in the list by the thumbnail image-providing unit, the moving images being obtained from the image data-storing unit.

According to the camera system of the present invention, one or more bases are selected from an image that includes a plurality of bases wherein the cameras are installed. A list of thumbnail images is then displayed which correspond to the cameras installed within the selected base.

Upon selecting a specific camera from among the cameras displayed in the thumbnail images, moving images corresponding to the selected specific camera are provided.

Herein, it is preferable that the camera system comprise a base number-providing unit totaling the number of the bases wherein the cameras are installed for each area to obtain a result. The totaling is performed based on the information stored by the camera installation information-storing unit with respect to the positions of the bases wherein the cameras are installed. The base number-providing unit provides an image that the result is displayed on a map.

With this structure, it becomes possible to recognize, per area, the number of bases, scattered in a wide range of areas, in which the cameras are installed.

In addition, it is also preferable that the camera base position-providing unit provide an image wherein one or more bases are displayed on a map, the one or more bases belonging to an area selected from one or more areas displayed by the base number-providing unit.

With this structure it becomes possible to recognize, per area, the number of bases scattered in the wide range of areas, and to select a specific area from the displayed areas, which permits to obtain an image wherein bases belonging to the selected specific area are displayed on a map.

EFFECT OF INVENTION (1) The camera system comprises: a plurality of cameras installed within a plurality of bases, respectively; a camera installation information-storing unit storing information with respect to positions of the bases wherein the cameras are installed; an image data-storing unit storing images photographed by the cameras as moving images and thumbnail images, respectively; a camera base position-providing unit providing an image that the bases are displayed on a map based on the information with respect to the positions of the bases wherein the cameras are installed, the information being stored by the camera installation information-storing unit; a thumbnail image-providing unit providing an image wherein a list of the thumbnail images are displayed, the thumbnail images corresponding to the cameras installed within one or more bases selected from among the bases displayed on the map, the thumbnail images being obtained from the image data-storing unit; and a moving image-providing unit providing moving images corresponding to one or more cameras selected from among the cameras whose thumbnail images are displayed in the list by the thumbnail image-providing unit, the moving images being obtained from the image data-storing unit.

With this structure, one or more bases are selected from an image that bases having a plurality of cameras installed therein are displayed on a map. A list of thumbnail images is displayed which correspond to a plurality cameras installed within the selected base. A specific camera is selected from the displayed thumbnail images, and moving images corresponding to the selected specific camera are provided.

In this way, it becomes possible to:

easily specify a camera among a plurality of cameras respectively installed within a plurality of bases; and confirm images of the specified camera.

(2) The camera system preferably comprises a base number-providing unit totaling the number of the bases wherein the cameras are installed for each area to obtain a result. The totaling is performed based on the information stored by the camera installation information-storing unit with respect to the positions of the bases wherein the cameras are installed. The base number-providing unit provides an image wherein the result is displayed on a map.

With this structure, it becomes possible to recognize, per area, the number of bases, scattered in a wide range of areas, in which the cameras are installed, respectively. Furthermore, it is also possible to easily recognize excess, deficiency, and/or deviation of the number of installed cameras.

(3) The camera base position-providing unit may provide an image wherein one or more bases are displayed on a map, the one or more bases belonging to an area selected from the one or more areas displayed by the base number-providing unit.

With this structure, an image wherein bases belonging to the selected area are displayed on a map is obtained by selecting an area from the displayed areas while recognizing, per area, the number of bases, scattered in a wide range of areas, in which the cameras are installed. In this way, it is possible to more easily specify bases including one or more cameras to be confirmed.

DETAILED DESCRIPTION OF THE PREFERRED EMBODIMENTS

Figure 1:
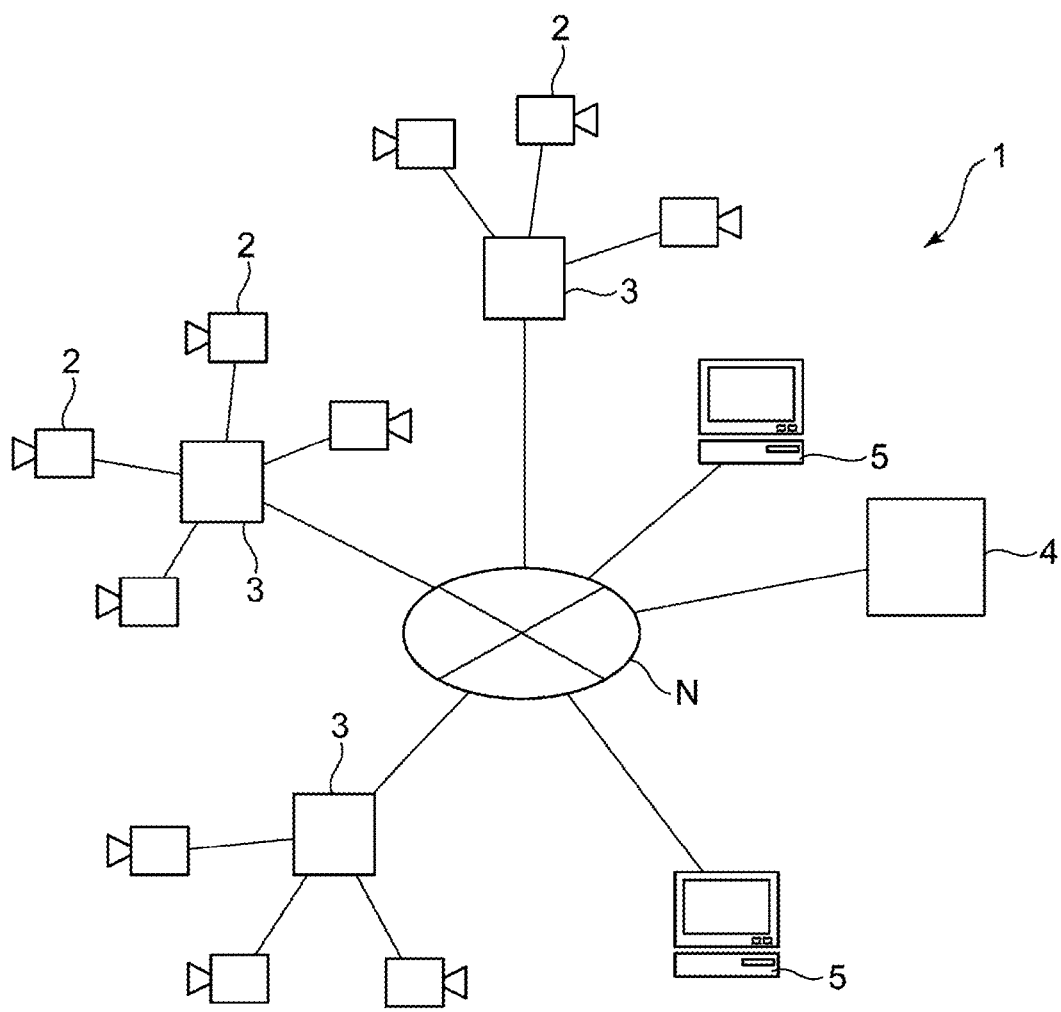
FIG. 1 is a schematic diagram of a camera system in Embodiment 1 according to the present invention.
Figure 2:
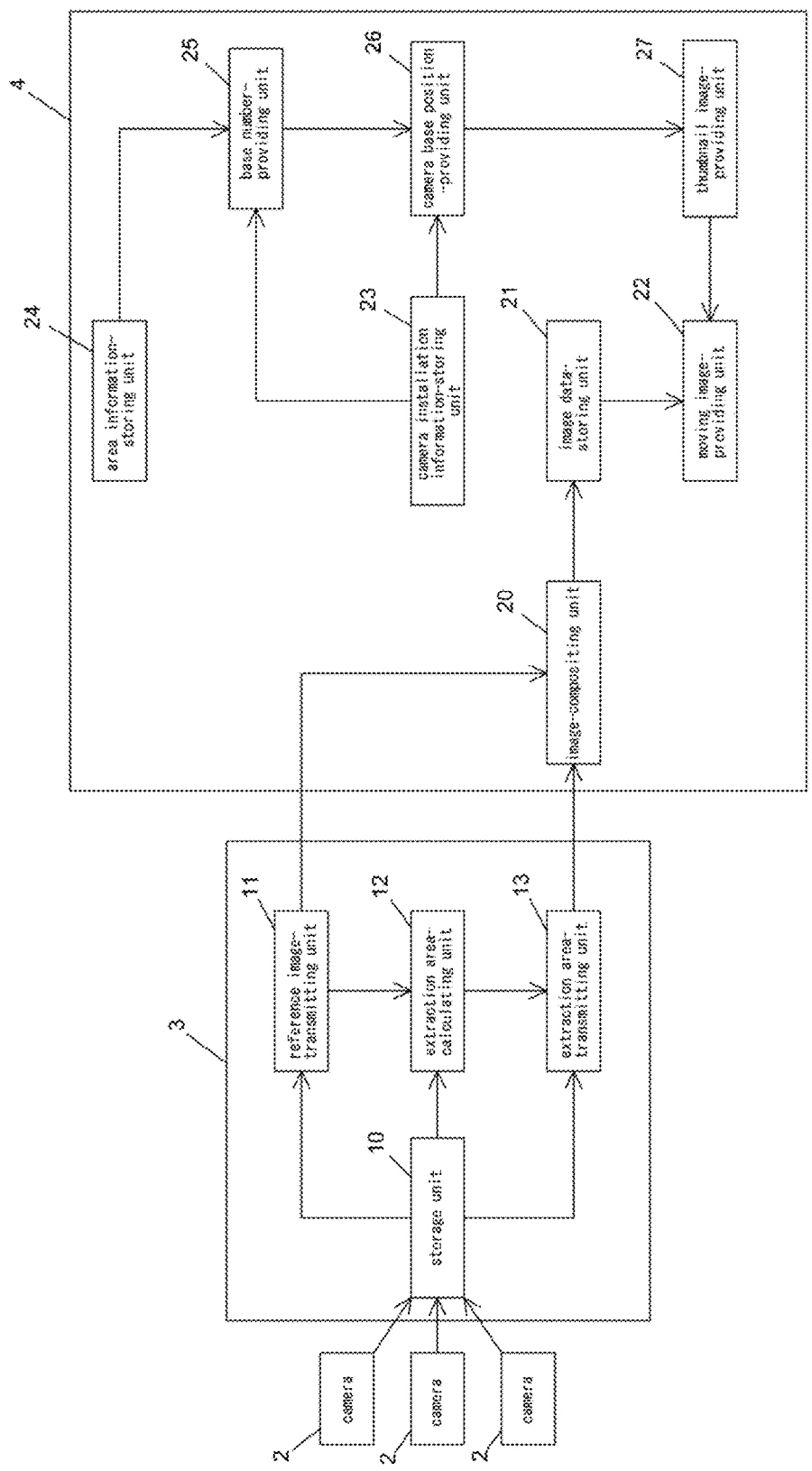
FIG. 2 is a block diagram of the camera system in FIG. 1.

FIG. 1 is a schematic diagram of a camera system in Embodiment 1 according to the present invention, and FIG. 2 is a block diagram of the camera system in FIG. 1.

In FIG. 1, a camera system 1 in Embodiment 1 according to the present invention includes the followings:

a plurality of cameras 2 being installed within a plurality of bases, respectively;

a base server 3 being installed within the respective base, the cameras 2 being connected to the base server 3, respectively; and a cloud server 4 being connected to the base server 3 via an electric telecommunication line N.

The cameras 2 are imaging devices for photographing still images at predetermined time intervals (e.g. time intervals of $1/120$ [sec] through 1 [sec]) to obtain continuous frame images.

As shown in FIG. 2, the base server 3 includes the followings:

a storage unit 10 temporarily storing the respective frame images of the continuous frame images obtained in sequence by the cameras 2;

a reference image-transmitting unit 11 transmitting data (hereinafter, called as "reference image data".) of a frame (hereinafter, called as "reference frame".) to be regarded as reference to the cloud server 4 in a predetermined timing;

an extraction area-calculating unit 12 calculating an area (hereinafter, called as "extraction area".) to be extracted from the respective frames after the reference frame with respect to a plurality of frames; and an extraction area-transmitting unit 13 extracting in sequence image data within the extraction area from images of the respective frames to transmit the extracted image data to the cloud server 4.

The reference image-transmitting unit 11 transmits image data (reference image data) of a frame (reference frame) to be regarded as reference in a predetermined timing to the cloud server from images of the continuous frames obtained in sequence by the cameras 2.

Herein, the reference frame may be determined at a predetermined timing (e.g. at time intervals of 30 [sec], 1 [min]), the predetermined number of frames, or the like.

The extraction area-calculating unit 12 performs:

obtaining an image (hereinafter, called as "background image".) to be regarded as background from images of the continuous frames obtained in sequence by the cameras 2; and with respect to the respective frames of the continuous frames obtained in sequence by the cameras 2, the respective frames being after the reference frame, calculating a third area surrounding both a first area and a second area, the first area surrounding an area wherein there is a difference between the respective frame image and the background image, the second area surrounding an area wherein there is a difference between an immediately before frame image of the respective frame image and the background image.

The third area is an area (extraction area) that the extraction area-transmitting unit 13 extracts and transmits thereof.

As for the background image, an average of frame images immediately before the respective frame may be used.

For example, upon calculating with respect to a frame area wherein there is a difference between the frame image and the background image, the extraction area-calculating unit 12 may use an average of one hundred frame images immediately before the frame as the background image to take a difference between this background image and the frame image.

The extraction area-calculating unit 12 performs such difference processing on the respective frames after the reference frame to calculate the third area surrounding both the first area and the second area. Herein, the first area surrounds an area wherein there is a difference between the respective frame image and the background image, and the second area surrounds an area wherein there is a difference between an immediately before frame image of the respective frame image and the background image.

The extraction area-transmitting unit 13 extracts in sequence image data of the third area from the respective frame images to transmit the extracted image data to the cloud server, the image data of the third area being calculated by the extraction area-calculating unit 12.

In addition to the extracted image data of the third area, the extraction area-transmitting unit 13 transmits an extraction area (coordinates (X, Y), width W, and height H thereof) to the cloud server 4.

The base server 3 is realized by running one or more programs on a computer so as to make the computer to function as the above units 11-13. The computer may be a universal server, a personal computer, a microcomputer, a PDA (personal digital assistant), a pocket computer, a smart phone, and a feature phone (portable telephone), or the like.

On the other hand, the cloud server 4 includes the followings:

an image-compositing unit 20 entering the reference image data transmitted from the base server 3 and the image data of the third area with respect to the respective frame to compose moving images;

an image data-storing unit 21 storing the moving images composed by the image-compositing unit 20; and a moving image-providing unit 22 providing the moving image stored by the image data-storing unit 21 to a computer 5 (See, FIG. 1.) connected via an electric telecommunication line N.

The computer 5 is a computer capable of being connected to the cloud computer 4 via the electric telecommunication lines N. The computer 5 may be a personal computer, a microcomputer, a PDA (personal digital assistant), a pocket computer, a smart phone, a feature phone (portable telephone), a handheld game machine, or the like.

The image-compositing unit 20 composes moving images from the reference image data transmitted from the base server 3 and the image date of the third area of the respective frames to store the composed moving images in the image data-storing unit 21.

In this Embodiment, the image-compositing unit 20 composes the moving images by replacing a part of the reference image data based on extraction area information of the respective frames with the image data of the third area of the respective frames.

For example, with respect to the reference frame image, based on extraction area information of the next frame, the image-compositing unit 20 replaces a part whose coordinates are (X, Y), whose width is W, and whose height is H of image data with image data of the third area of the same frame to make the replaced image data to be image data for the next frame of the reference frame.

With respect to the further next frame, the image-compositing unit 20 composes moving images by replacing in sequence, based on extraction area information, image data of an immediately before frame with image data of the third area.

The composed moving images are stored in the image data-storing unit 21 as moving images generated from still images photographed by the respective cameras 2.

In addition, thumbnail images of the images photographed by the respective cameras 2 are also pre-generated and stored in the same image data-storing unit 21.

In response to a request from the computer 5 connected via the electric telecommunication lines N, the moving image-providing unit 22 provides the computer 5 with the moving images stored in the image data-storing unit 21.

When the computer 5 requests moving images while specifying the cameras 2 within a target base, the moving image-providing unit 22 obtains the requested moving images from the image data-storing unit 21, and provides the computer 5 via the electric telecommunication lines N with the requested moving images.

Processes of specifying a camera 2 within the respective target base, and requesting moving images thereof will be mentioned later.

In addition, the cloud server 4 includes the followings:

a camera installation information-storing unit 23 storing information with respect to the positions of the respective bases wherein the cameras 2 are installed;

an area information-storing unit 24 storing area information for classifying areas of the respective bases wherein the cameras 2 are installed:

a base number-providing unit 25 totaling the number of bases wherein the cameras 2 are installed for each area to provide an image wherein the totaled number of bases is displayed;

a camera base position-providing unit 26 providing an image that the respective bases wherein the cameras are installed is displayed on a map; and a thumbnail image-providing unit 27 providing thumbnail images corresponding to the respective cameras 2.

The information stored by the camera installation information-storing unit 23 with respect to the positions of the respective bases includes items for specifying names, geographic coordinates, addresses, or the like of the respective bases.

The area information stored by the area information-storing unit 24 includes:

items of names (of cities, wards, towns, and villages, or the like.) for classifying the respective bases into one of the areas; and items (a set of geographic coordinates, or the like.) for indicating ranges of the respective bases.

In response to a request from the computer 5 connected via the electric telecommunication lines N, the base number-providing unit 25 totals the number of the bases wherein the cameras 2 are installed for each area to obtain a result. The totaling is based on the information stored by the camera installation information-storing unit 23 with respect to the positions of the bases wherein the cameras are installed. The base number-providing unit 25 provides an image wherein the result is displayed on a map.

Figure 3:
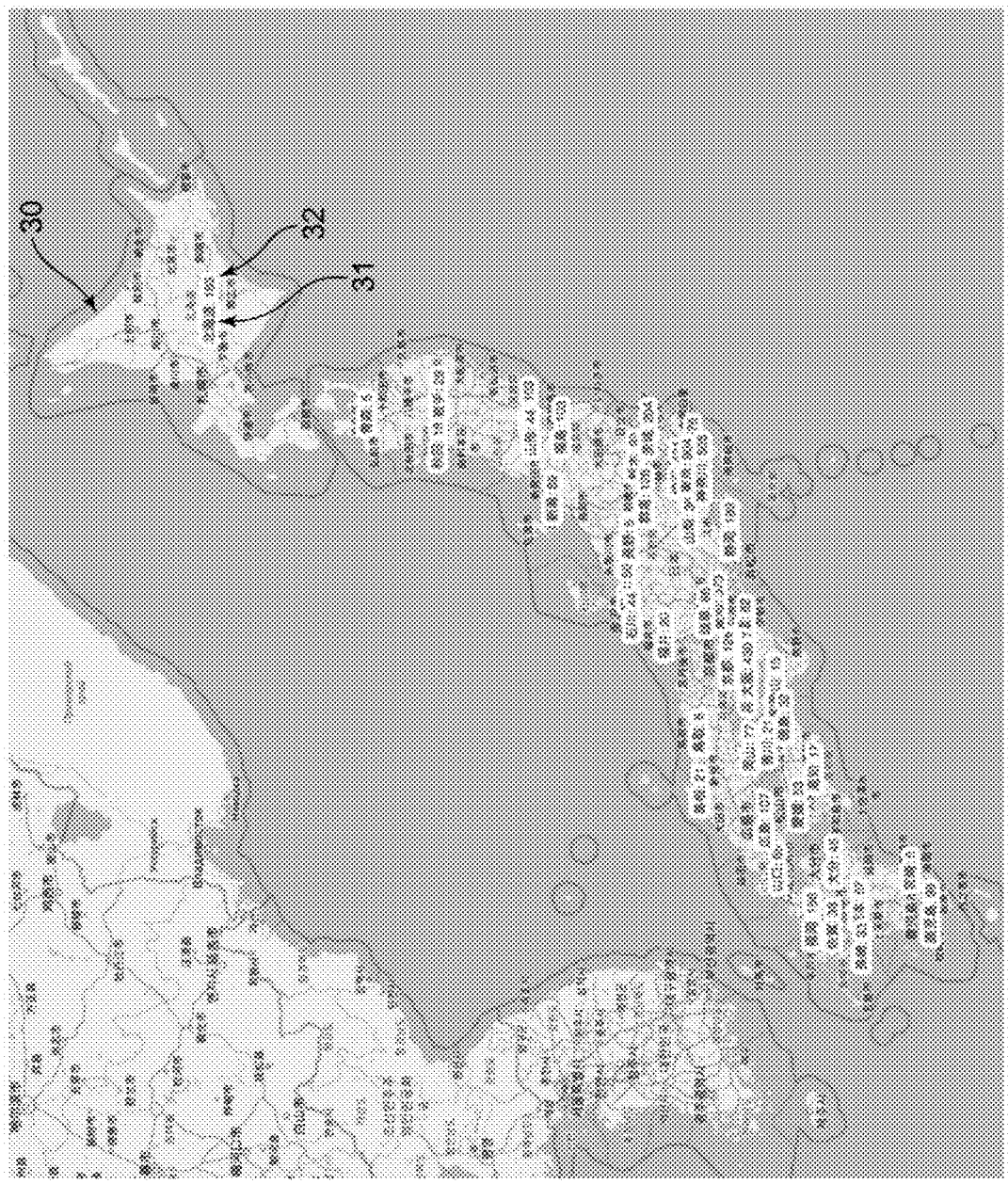
FIG. 3 shows an example of an image wherein the number of bases is, per prefecture, totaled, and the totaled number is displayed on a map.

FIG. 3 shows an example of an image wherein the number of bases is totaled for each prefecture, and totaled numbers are displayed on a map.

As shown in FIG. 3, this images shows names 31 of totaled areas and numbers 32 of total bases for each area.

Herein, when the computer 5 issues instructions of zoom in and/or zoom out, the base number-providing unit 25 makes the map to zoom in and/or to zoom out in accordance with the instructions.

Furthermore, the base number-providing unit 25 increases/decreases the scale of area classification for totaling the numbers, re-totals the number of bases for each new increased/decreased scale of area, and displays re-totaled numbers on the map.

Figure 4:
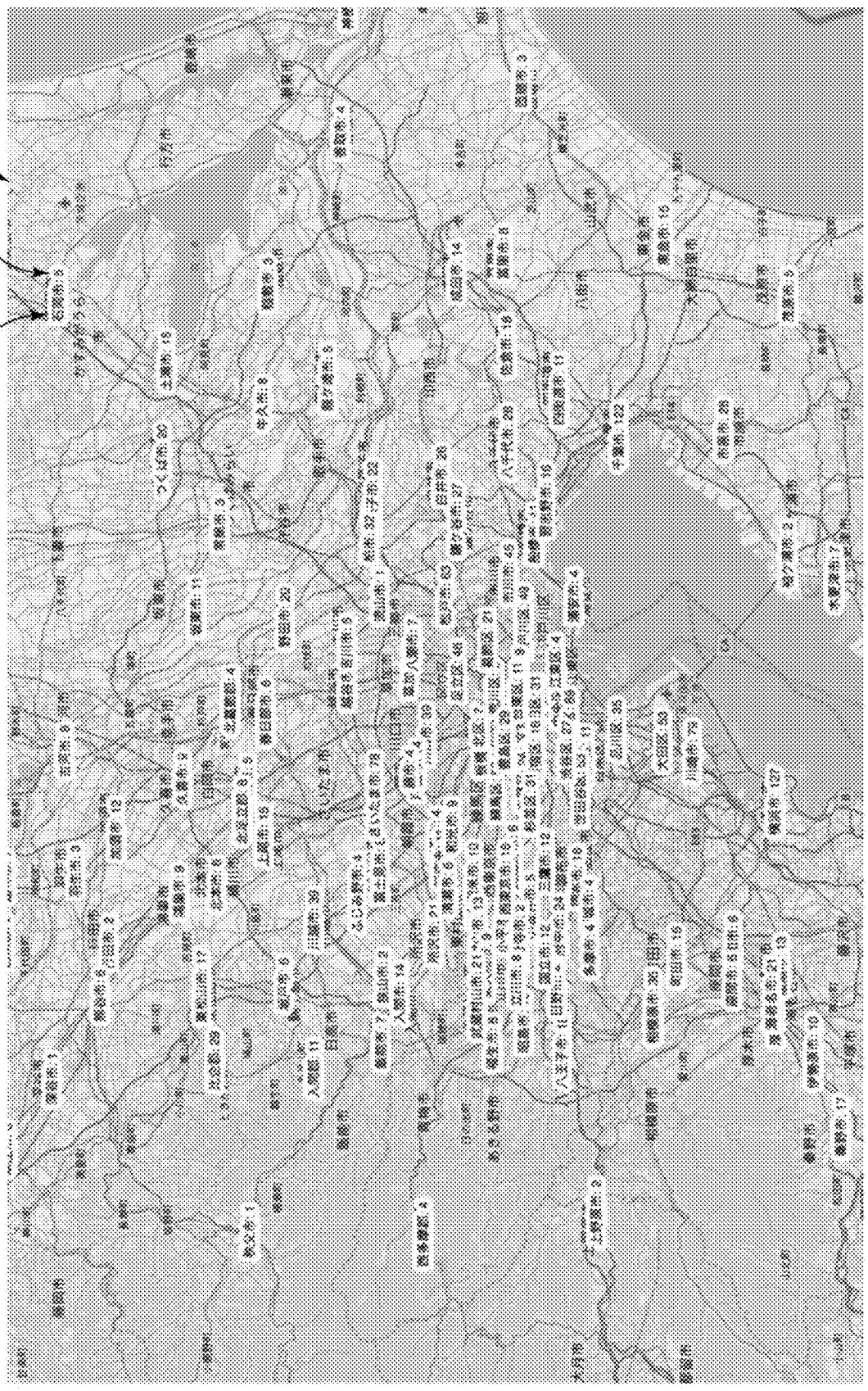
FIG. 4 shows an example of an image wherein the number of bases is, per municipality, totaled, and the totaled number is displayed on a map.

FIG. 4 shows an example of an image wherein the number of bases is, per municipality, totaled, and the totaled number is displayed on a map.

The camera base position-providing unit 26 provides the computer 5 with an image that the respective bases are displayed on a map according to the information stored by the camera installation information-storing unit 23 with respect to the respective bases wherein the cameras 2 are installed.

Figure 5:
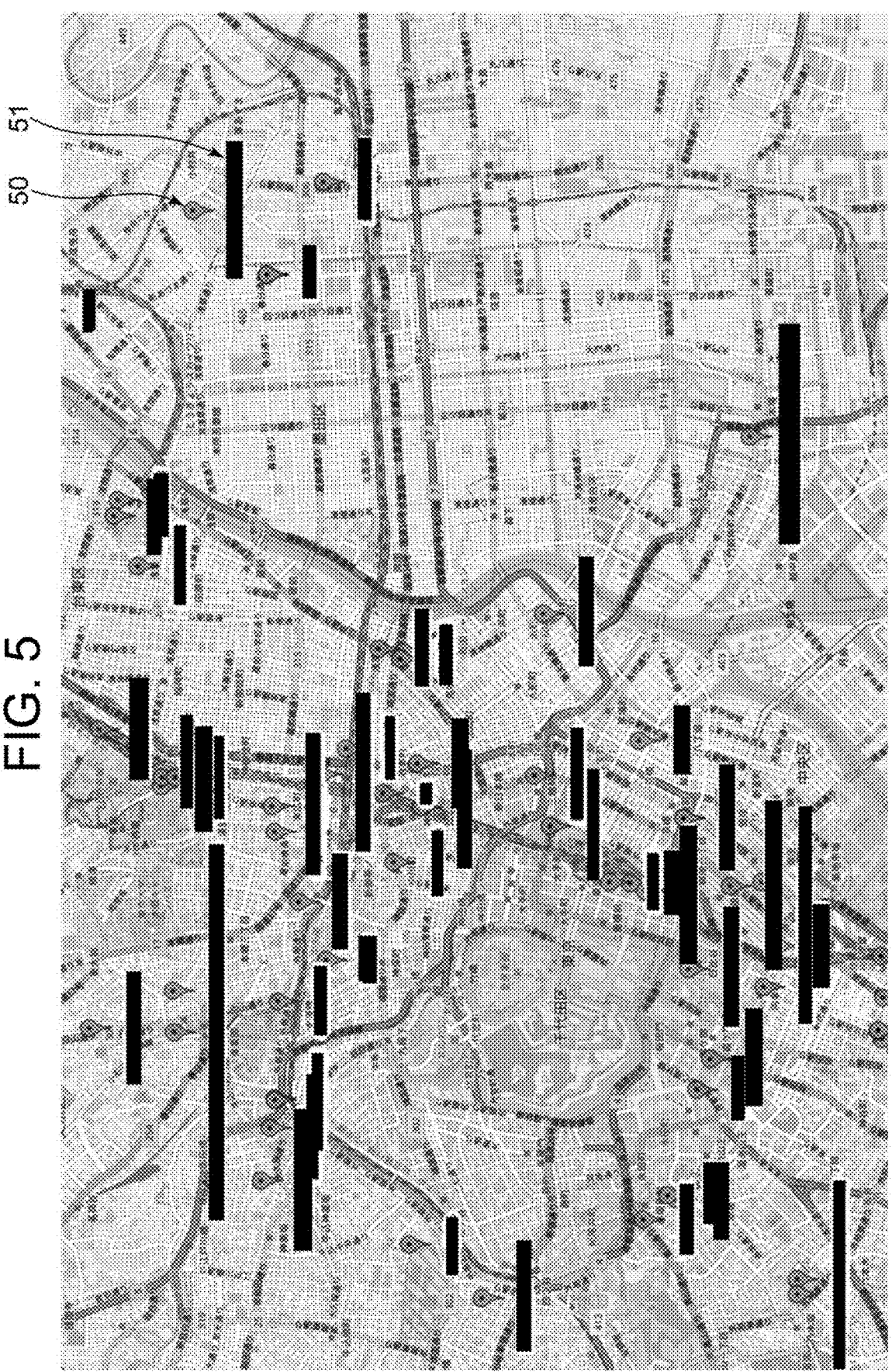
FIG. 5 shows an example of an image wherein bases in which a plurality of cameras are installed are displayed on a map, respectively.

FIG. 5 shows an example of an image that the respective bases wherein the cameras 2 are installed are displayed on a map.

As shown in FIG. 5, this image shows icons 50 indicating positions of the respective bases wherein the cameras 2 are installed, and names 51 of the respective bases.

When an area is selected by such as clicking a name 31 of area and/or the number 32 of bases from areas displayed by the above-mentioned base number-providing unit 25, the camera base position-providing unit 26 provides the computer 5 with an image that the respective bases belonging to the selected area are displayed on the map.

In addition, similarly to the number-providing unit 25, when the computer 5 issues instructions of zoom in so as to subdivide the scale of the map to be a predetermined area class, the camera base position-providing unit 26 makes the map to zoom in and/or to zoom out in accordance with the instructions, and provides the computer 5 with an image that the respective bases belonging to the selected area are displayed on the map.

The thumbnail image-providing unit 27 obtains from the image data-storing unit 21 thumbnail images corresponding to the cameras 2 installed within the base selected by such as clicking the icon 50 and/or the name 51 on the map from among the respective bases whose the icon 50 and/or the name 51 are displayed on the map. The thumbnail image-providing unit 27 provides the computer 5 with an image that a list of the obtained thumbnail images is displayed thereon.

Figure 6:
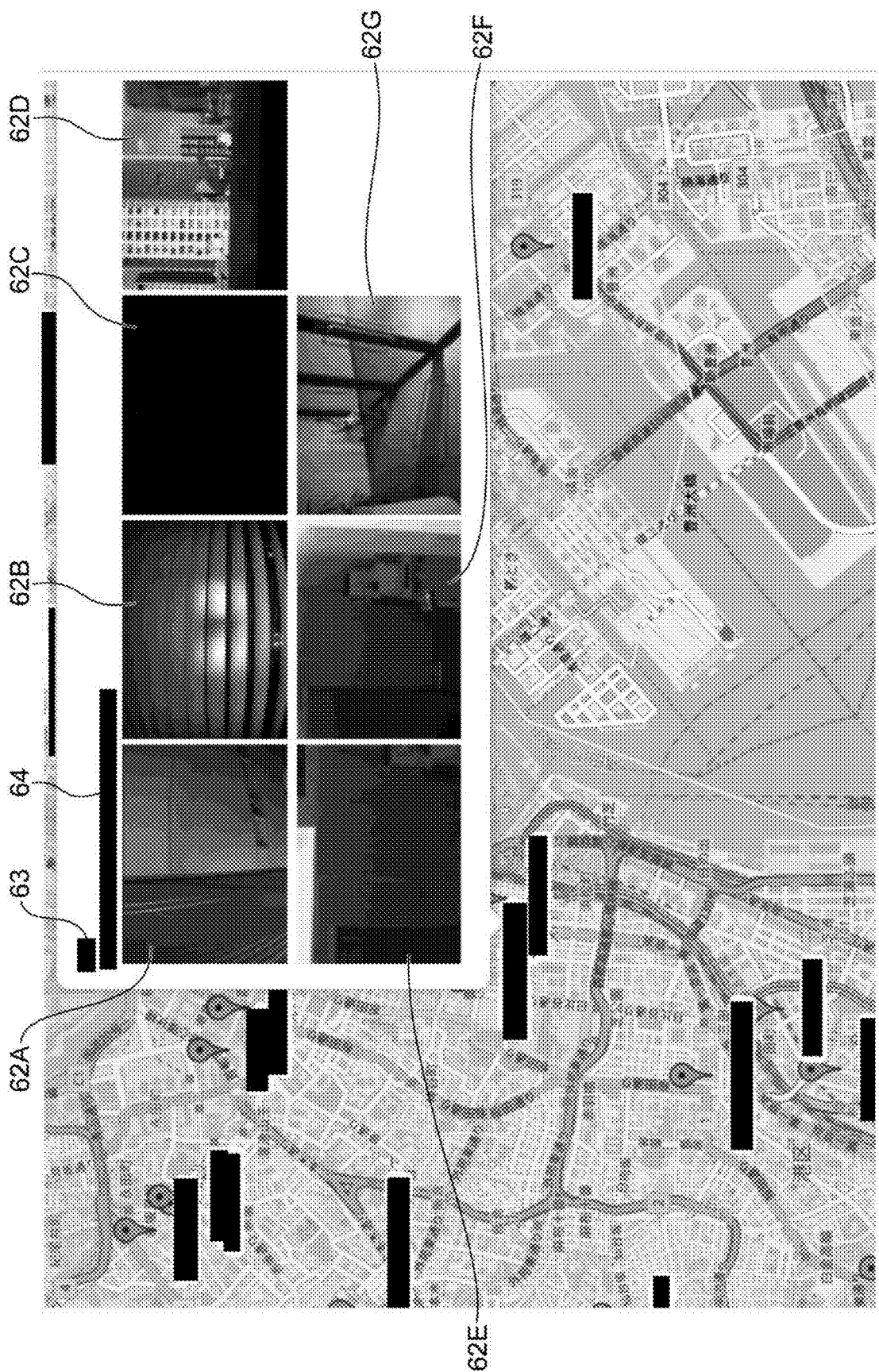
FIG. 6 shows an example of an image wherein a list of thumbnail images corresponding to a plurality of cameras is displayed thereon, the cameras being installed within a selected base.

FIG. 6 shows an example of the image wherein a list of thumbnail images 62A, 62B, 62C, 62D, 62E, 62F, and 62G corresponding to the cameras 2 installed within the selected base are displayed thereon.

As shown in FIG. 6, the thumbnail image-providing unit 27 also shows a name 63 and an address 64 of the selected base.

The above-mentioned moving image-providing unit 22 obtains from the image data-storing unit 21 moving images corresponding to the camera selected from cameras whose thumbnail images are displayed in a manner of a list.

When one thumbnail image is selected from thumbnail images 62A-62G shown in FIG. 6 by clicking thereof or the like, the moving image-providing unit 22 obtains from the image data-storing unit 21 moving images corresponding to the selected camera based on the selected thumbnail image, and provides the same for the computer 5.

Figure 7:
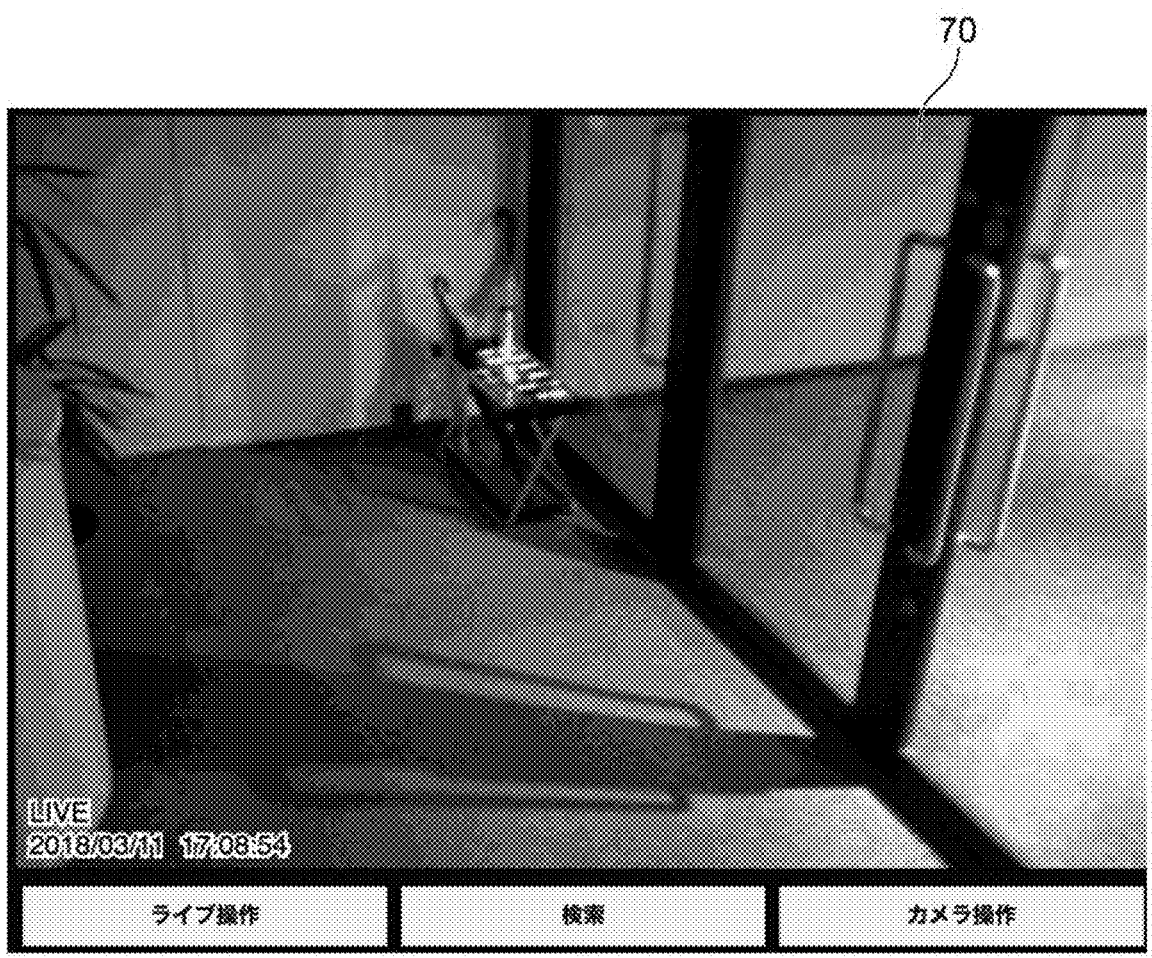
FIG. 7 is an example of a screen that shows moving images of a selected camera.

FIG. 7 shows an example of a moving image display screen when the thumbnail image 62G shown in FIG. 6 is selected.

As shown in FIG. 7, moving images 70 corresponding to the selected camera by the thumbnail image 62G are displayed on this moving image display screen.

The cloud server 4 according to the above-mentioned structure is realized by running one or more programs on a server built in a cloud environment for making the server to function as the above respective units.

The camera system 1 with the above-mentioned structure provides the following benefits.

A base is selected from the image that the respective bases having the cameras 2 installed therein are displayed on the map, as shown in FIG. 5. Then, as show in FIG. 6, a list of thumbnail images 62A-62D is displayed which correspond to the cameras 2 installed within the selected base.

Furthermore, when one camera 2 is selected from among the cameras 2 whose thumbnail images are displayed in a manner of a list, moving images corresponding to the selected camera 2 are provided to the computer 5.

Accordingly, it is possible to easily specify a specific camera 2 among the cameras 2 installed within the respective bases so as to confirm moving images with respect to the same.

In this camera system 1, the base number-providing unit 25 totals the number of the bases wherein the cameras 2 are installed for each area based on the information with respect to the positions of the bases 2 stored by the camera installation information-storing unit 23. Then, as shown in FIG. 3 and FIG. 4, the base number-providing unit 25 provides an image that the result is displayed on a map to the computer 5.

Accordingly, it is possible to recognize, per area, the number of bases scattered in a wide range of areas, wherein the cameras are installed, respectively. Furthermore, it is also possible to easily recognize excess, deficiency, and/or deviation of the number of installed cameras.

Furthermore, in this camera system 1, the camera base position-providing unit 26 provides an image wherein one or more bases are displayed on a map, the one or more bases belonging to an area selected from one or more areas displayed by the base number-providing unit 25.

Therefore, while recognizing, per area, the number of bases scattered in the wide range of areas, wherein the cameras are installed respectively, selecting an area from among the displayed areas causes to obtain an image that bases belonging to the selected area are displayed on the map. In this way, it is possible to more easily specify bases including one or more cameras to be confirmed.

Herein, with respect to the computer 5, it is possible to set up an accessible range of the image data-storing unit 21 and the camera installation information-storing unit 23 according to certification of users.

This arrangement enables to limit, for each user, information provided by: the base number-providing unit 25; the camera base position-providing unit 26; the thumbnail image-providing unit 27; and the moving image-providing unit 22 in a manner such that each user is provided with only information that he/she can access.

INDUSTRIAL APPLICABILITY

The camera system according to the present invention is suitable as a camera system displaying images of many cameras installed within a plurality of bases. This system is also preferable as a camera system capable of easily specifying a camera among many cameras respectively installed within the bases so as to confirm images with respect to the same.

The entire disclosure of Japanese Patent Application No. 2018-051432 filed on Mar. 19, 2018 including specification, claims, drawings and summary is incorporated herein by reference in its entirety.

BRIEF DESCRIPTION OF SYMBOLS

1: Camera System
2: Camera
3: Base Server
4: Cloud Server
10: Storage Unit
11: Reference Image-transmitting Unit
12: Extraction Area-calculating Unit
13: Extraction Area-transmitting Unit
20: Image-compositing Unit
21: Image Data-storing Unit
22: Moving Image-providing Unit
23: Camera Installation Information-storing Unit
24: Area Information-storing Unit
25: Base Number-providing Unit
26: Camera Base Position-providing Unit
27: Thumbnail Image-providing Unit

The invention claimed is:

1. A camera system, comprising:
a plurality of cameras and a base sever connected to the plurality of cameras, being installed within each of a plurality of bases;
a cloud server connected to the base server via an electric telecommunication line; and
a computer connected to the cloud server via an electric telecommunication line,
wherein, in each of the plurality of bases, the base server receives images photographed by the plurality of cameras respectively, and transmits the images to the cloud server;
wherein the cloud server comprises:
a camera installation information-storing unit including one or more storages that store information with respect to positions of the bases wherein the cameras are installed, and names and addresses of the bases; and
an image data-storing unit including one or more storages that store the images transmitted by the base server in each of the plurality of bases, as moving images and thumbnail images, respectively,
wherein the cloud server
provides the computer with image data containing icons and the names of the bases generated based on the information with respect to the positions of the bases wherein the cameras are installed, the information being stored by the camera installation information-storing unit, such that the computer generates an image that the bases are displayed on a map based on the image data containing icons and the names of the bases;
provides the computer with data of the thumbnail images stored in the image data-storing unit, such that the computer generates an image wherein a list of the thumbnail images with the names and addresses of the bases is displayed, the thumbnail images being corresponding to all of the cameras installed within one or more bases selected from among the bases displayed on the map; and
provides the computer with data of moving images obtained from the image data-storing unit, such that the computer generates the moving images to be displayed, the moving images being corresponding to one or more cameras selected from among the cameras whose thumbnail images are displayed in the list of the thumbnail images with the names and addresses of the bases, and
wherein the computer causes a user to identify name and address corresponding to each of the cameras installed within the one or more bases selected from among the bases displayed on the map by referring to the list of the thumbnail images with the names and addresses of the bases.

2. The camera system as defined in claim 1, wherein the cloud server obtains information with respect to the positions of the bases wherein the cameras are installed, to total a number of the bases wherein the cameras are installed for each area to obtain a result, the information being stored by the camera installation information-storing unit, thereby generating an image wherein the result is displayed on a map.

3. The camera system as defined in claim 2, wherein the cloud server provides an image wherein one or more bases are displayed on a map, the one or more bases belonging to an area selected from the one or more areas displayed by the base number-providing unit.

4. The camera system as defined in claim 1, wherein the moving images stored by the image data-storing unit are moving images generated from still images photographed by the cameras, respectively.

5. The camera system as defined in claim 2, wherein the moving images stored by the image data-storing unit are moving images generated from still images photographed by the cameras, respectively.

6. The camera system as defined in claim 3, wherein the moving images stored by the image data-storing unit are moving images generated from still images photographed by the cameras, respectively.

7. The camera system as defined in claim 1, wherein,
when none of the bases is included or identified in the map, the thumbnail image-providing unit provides no image wherein the list of the thumbnail images is displayed.

8. The camera system as defined in claim 1, wherein:
in accordance with an instruction of zoom in or zoom out, the base number-providing unit makes the map to zoom in or to zoom out, respectively; and
increases or decreases a scale of area classification for totaling the numbers, respectively, re-totals the number of bases for each new increased or decreased scale of area, and displays re-totaled numbers on the map.

9. The camera system as defined in claim 1, wherein the map shows geographic areas.

* * * * *